L. KLARMANN.
WASTE PIPE CLEANER.
APPLICATION FILED MAR. 27, 1919.
1,312,404.
Patented Aug. 5, 1919.
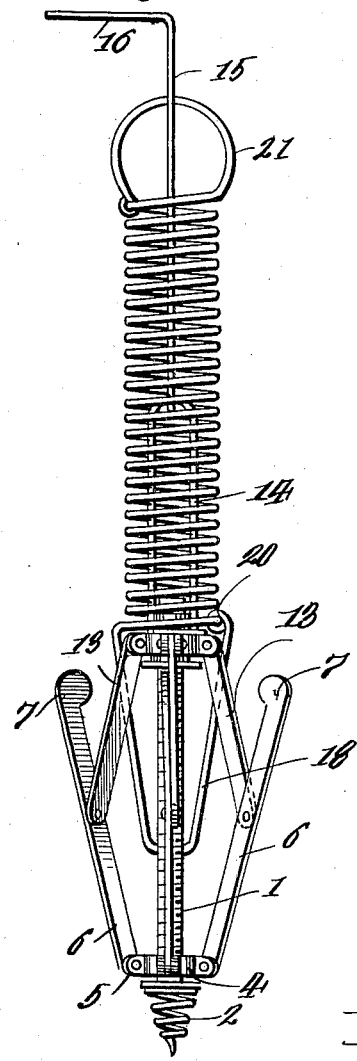
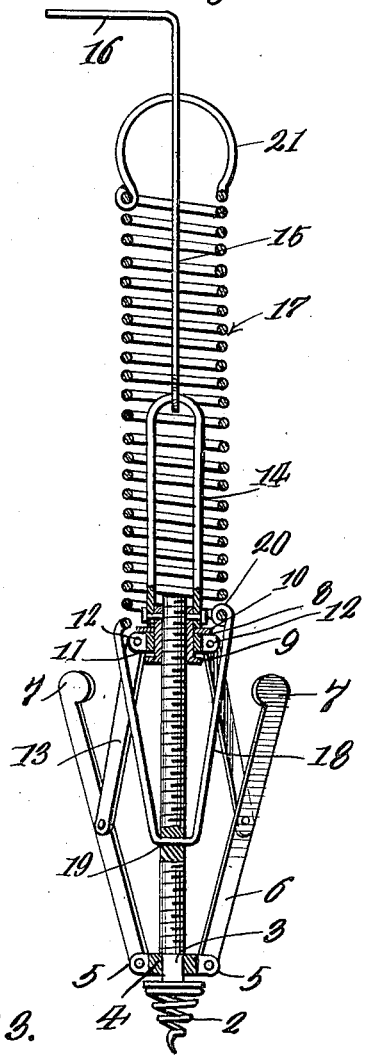
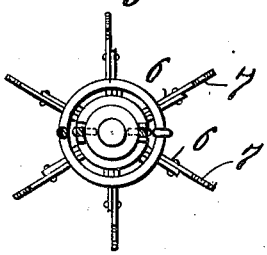
WITNESS:
Guy M. Shrung
S. M. McColl
INVENTOR.
Louis Klarmann
BY
Richard B Owen
ATTORNEY.

UNITED STATES PATENT OFFICE.

LOUIS KLARMANN, OF NORTH BERGEN, NEW JERSEY.

WASTE-PIPE CLEANER.

1,312,404.  Specification of Letters Patent.  Patented Aug. 5, 1919.

Application filed March 27, 1919. Serial No. 285,618.

*To all whom it may concern:*

Be it known that I, LOUIS KLARMANN, a citizen of the United States, residing at North Bergen, in the county of Hudson and State of New Jersey, have invented certain new and useful Improvements in Waste-Pipe Cleaners, of which the following is a specification.

This invention relates to plumbers' tools, and more particularly to pipe cleaners for use by plumbers, householders, and others.

The object of the invention is to provide a simply constructed, cheap and efficient device of this character adapted for use in cleaning out the traps of sinks, tubs, toilets and the like.

Another object is to so construct such a device that it may be expanded and contracted to thoroughly loosen up grease or other matter which clogs the pipes.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a side elevation of an implement constructed in accordance with this invention, Fig. 2 is a longitudinal sectional view thereof with parts broken out, and Fig. 3 is a horizontal section taken on the line 3—3 of Fig. 1.

In the embodiment illustrated, the tool constituting this invention comprises a coarsely threaded rod 1 with a cone-shaped corkscrew-like member 2 fixed to its lower end, which is designed to enter the pipe to be cleaned and open up the way for the body of the implement. The lower end of the rod 1 is reduced and made angular as shown at 3 and has mounted therein a collar 4 provided with peripherally spaced radially extending pairs of apertured ears 5 between which are pivoted links 6. Any desired number of these links may be employed, six being here shown and which are constructed of any suitable material, preferably of hard steel or iron straps, when the device is to be used for large sewer pipes, and of less rigid material when used for smaller pipes. The free ends of these links 6 are provided with flat heads 7 designed to operate as scrapers when the device is rotated within the pipe to be cleaned.

A nut 8 has threaded engagement with rod 1 and is provided with longitudinally spaced radially extending annular flanges 9 and 10 to form a seat for the collar 11 designed to be loosely mounted on said nut so as to permit the nut to turn within the collar. This collar 11 has peripherally spaced radially extending pairs of apertured ears 12 similar to the ears 5 of collar 4 and arranged in alinement therewith, and which are designed to receive the upper ends of links 13 which are pivotally connected between said ears and at their other ends are pivoted to the links 6, preferably midway their ends as shown clearly in Figs. 1 and 2.

An inverted U-shaped member 14 is connected at the free ends of its arms with the collar 11 at diametrically opposite points and straddles the upper end of the rod 1.

An actuating rod 15 has loose engagement with the cross bar of the member 14 as is shown clearly in Fig. 2, and is provided at its upper end with a laterally extending arm 16 to form a hand grip. It will be readily seen that the turning of the member 14 will operate to rotate the nut 8 on rod 1 and move collar 11 longitudinally thereof according to the direction in which the nut is turned.

A casing 17 surrounds the members 14 and 15 and is connected with rod 1. This casing is here shown constructed of coiled wire to form a flexible tube and is secured at its lower end to the rod by a U-shaped member 18, the cross bar 19 of which extends transversely through the rod 1 and the arms thereof straddle the nut and collar and are secured at their free ends to the lower end of the casing 17 in any suitable manner, said member 18 being here shown in the form of an extension of the wire forming the casing 17. The free end of this wire is bent to form an eye 20 which is engaged with one of the coils at the bottom of casing 17.

By connecting the links 13 and 6 in the manner above described, a jointed structure will be formed which may be expanded or collapsed according to the direction in which the nut 8 is moved on the rod 1, it being obvious that when this nut is moved toward the lower end of the rod, the jointed structure will be expanded and when moved toward the upper end it will be collapsed or retracted.

In the use of this device, the corkscrew member 2 is first inserted in the pipe to force an entrance for the tool and the turning of the handle member 16 toward the right will operate to move the nut 8 downwardly carrying with it collar 11 and thus forcing open the jointed structure formed by the connected links 6 and 13 which will force the edges of the links 6 into scraping engagement with the pipe to be opened, and if found necessary, the whole structure may be rotated by grasping the handle 21 formed at the upper end of casing 17 and turning it.

By the jointed construction of the cleaning device it will be obvious that it may be readily adapted for use in pipes of different diameters and the tool will be found very useful not only for plumbers but for householders.

From the foregoing description, taken in connection with the accompanying drawings, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

Having thus fully described my invention, what I claim as new and desire to secure by Letters Patent, is:—

1. A tool of the class described comprising a threaded rod, a cone-shaped corkscrew-like member fixed to one end thereof, a collar mounted on said rod, at the rear of said member, links pivotally connected with said collar, a nut having threaded engagement with said rod and provided in its periphery with an annular seat, a collar mounted in said seat and loosely engaging said nut, links pivotally connected at one end with said collar and at their other end with said first-mentioned links intermediately of their ends, and means connected to rotate said nut for opening and closing said links.

2. A tool of the class described comprising a threaded rod, a cone-shaped corkscrew-like member fixed to one end thereof, a collar mounted on said rod, at the rear of said member, links pivotally connected with said collar, a nut having threaded engagement with said rod and provided in its periphery with an annular seat, a collar mounted in said seat and loosely engaging said nut, links pivotally connected at one end with said collar and at their other end with said first-mentioned links intermediately of their ends, an inverted U-shaped member having the free ends of its arms fixed to said nut, an actuating rod connected with said U-shaped member, and a tubular casing surrounding said nut actuating means and carried by said rod.

3. A tool of the class described comprising a threaded rod, a cone-shaped corkscrew-like member fixed to one end thereof, a collar mounted on said rod, at the rear of said member, links pivotally connected with said collar, a nut having threaded engagement with said rod and provided in its periphery with an annular seat, a collar mounted in said seat and loosely engaging said nut, links pivotally connected at one end with said collar and at their other end with said first-mentioned links intermediately of their ends, an inverted U-shaped member having the free ends of its arms fixed to said nut, an actuating rod connected with said U-shaped member, a flexible tubular member inclosing said nut actuating means, and a U-shaped member extending transversely through said rod connected to support said tubular member.

In testimony whereof I affix my signature in presence of two witnesses.

LOUIS KLARMANN.

Witnesses:
 REINHARD UYLEMANN,
 THEODORE F. MAIER.

Copies of this patent may be obtained for five cents each, by addressing the "Commissioner of Patents Washington, D. C."